(12) United States Patent
Nakano et al.

(10) Patent No.: US 9,864,902 B2
(45) Date of Patent: Jan. 9, 2018

(54) APPARATUS AND METHOD OF COLLATING CATEGORIES OF IMAGES

(71) Applicant: CANON KABUSHIKI KAISHA, Tokyo (JP)

(72) Inventors: Shunsuke Nakano, Kawasaki (JP); Hiroshi Sato, Kawasaki (JP); Yuji Kaneda, Kawasaki (JP); Takashi Suzuki, Tokyo (JP); Atsuo Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/806,957

(22) Filed: Jul. 23, 2015

(65) Prior Publication Data

US 2016/0034782 A1 Feb. 4, 2016

(30) Foreign Application Priority Data

Jul. 29, 2014 (JP) ................................. 2014-154334

(51) Int. Cl.
*G06K 9/00* (2006.01)
*G06K 9/62* (2006.01)

(52) U.S. Cl.
CPC ......... *G06K 9/00288* (2013.01); *G06K 9/627* (2013.01)

(58) Field of Classification Search
CPC ........................... G06K 9/627; G06K 9/00288
See application file for complete search history.

(56) References Cited

U.S. PATENT DOCUMENTS

| 8,213,689 B2 | 7/2012 | Yagnik et al. | |
| 2005/0226471 A1* | 10/2005 | Singh | G06K 9/00288 382/118 |
| 2007/0104362 A1* | 5/2007 | Hwang | G06K 9/00275 382/159 |
| 2007/0217676 A1* | 9/2007 | Grauman | G06K 9/4671 382/170 |

(Continued)

FOREIGN PATENT DOCUMENTS

| JP | H11353485 A | 12/1999 |
| JP | 2010-244511 A | 10/2010 |

(Continued)

OTHER PUBLICATIONS

Cheng et al., "Custom Pictorial Structures for Re-identification", 2011, pp. 1-11.

(Continued)

*Primary Examiner* — Chan Park
*Assistant Examiner* — Elisa Rice
(74) *Attorney, Agent, or Firm* — Carter, DeLuca, Farrell & Schmidt, LLP

(57) ABSTRACT

An image processing apparatus includes: a holding unit that holds a plurality of images; a condition checking unit that checks imaging conditions of the plurality of images; a collation determining unit that determines whether to collate images among the plurality of images based on the imaging conditions of the images; a collation unit that collates the images determined to be collated by the collation determining unit to obtain a degree of similarity; and a classifying unit that classifies the collated images into a same category when the degree of similarity is equal to or greater than a predetermined threshold.

8 Claims, 12 Drawing Sheets

(56) References Cited

U.S. PATENT DOCUMENTS

| | | | |
|---|---|---|---|
| 2010/0021070 A1* | 1/2010 | Lo | G06K 9/00664 |
| | | | 382/224 |
| 2010/0054599 A1* | 3/2010 | Itonori | G06K 9/03 |
| | | | 382/177 |
| 2012/0027311 A1* | 2/2012 | Cok | G06F 17/30247 |
| | | | 382/224 |

FOREIGN PATENT DOCUMENTS

| | | |
|---|---|---|
| JP | 4910827 B2 | 4/2012 |
| JP | 2013-196043 A | 9/2013 |

OTHER PUBLICATIONS

Li et al., "Support vector machine based multi-view face detection and recognition", Image and Vision Computing 22, 2004, pp. 413-427.

Yi et al., "Towards Pose Robust Face Recognition", Center for Biometrics and Security Research & National Laboratory of Pattern Recognition Institute of Automation, Chinese Academy of Sciences, 2012, pp. 3539-3545.

Cootes et al., "Active Shape Models—Their Training and Application", Computer Vision and Image Understanding, vol. 61, No. 1, 1995, pp. 38-59.

Kanade et al., "Multi-Subregion Based Probabilistic Approach Toward Pose Invariant Face Recognition", Proc. of IEEE International Symposium on Computational Intelligence in Robotics and Automation (CIRA), 2003, pp. 954-959.

* cited by examiner

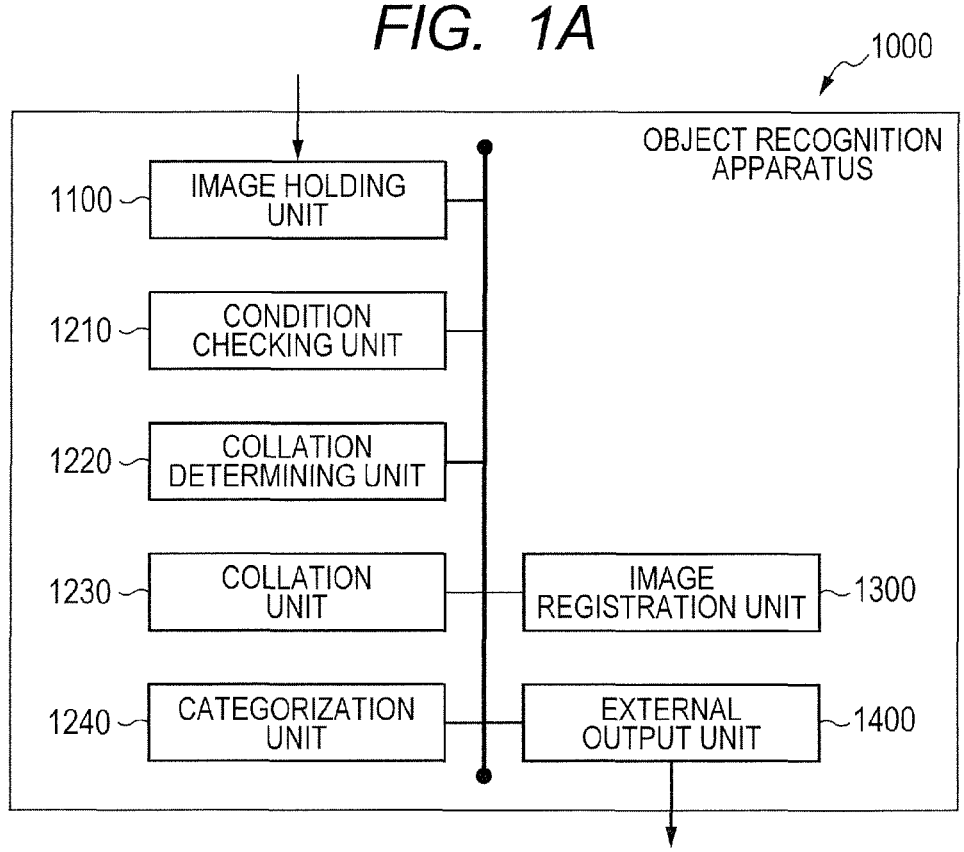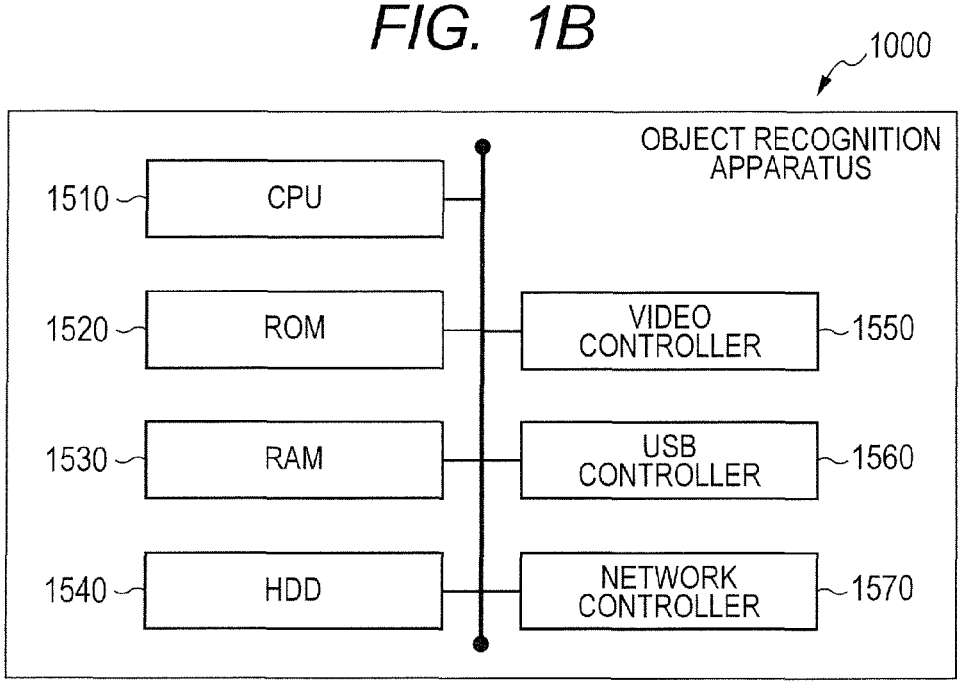

| IMAGE ID | IMAGING CONDITION | CATEGORY ID |
|---|---|---|
| A | FRONT | 1 |
| B | SIDE | 2 |
| C | DIAGONAL IN FRONT | - |
| D | : | - |
| E | : | - |
| F | : | - |
| G | : | - |

(3a)

| IMAGE ID | IMAGING CONDITION | CATEGORY ID |
|---|---|---|
| A | FRONT | 1 |
| B | SIDE | 2 |
| C | DIAGONAL IN FRONT | 3 |
| D | : | 4 |
| E | : | 5 |
| F | : | 6 |
| G | : | 7 |

(1b)

| IMAGE ID | IMAGING CONDITION | CATEGORY ID |
|---|---|---|
| A | FRONT | 1 |
| B | SIDE | 2 |
| C | DIAGONAL IN FRONT | 1 |
| D | : | - |
| E | : | - |
| F | : | - |
| G | : | - |

(3b)

| IMAGE ID | IMAGING CONDITION | CATEGORY ID |
|---|---|---|
| A | FRONT | 1 |
| B | SIDE | 1 |
| C | DIAGONAL IN FRONT | 3 |
| D | : | 3 |
| E | : | 5 |
| F | : | 5 |
| G | : | 7 |

(1c)

| IMAGE ID | IMAGING CONDITION | CATEGORY ID |
|---|---|---|
| A | FRONT | 1 |
| B | SIDE | 2 |
| C | DIAGONAL IN FRONT | 1 |
| D | : | 1 |
| E | : | 2 |
| F | : | 2 |
| G | : | - |

(3c)

| IMAGE ID | IMAGING CONDITION | CATEGORY ID |
|---|---|---|
| A | FRONT | 1 |
| B | SIDE | 1 |
| C | DIAGONAL IN FRONT | 1 |
| D | : | 1 |
| E | : | 5 |
| F | : | 5 |
| G | : | 7 |

APPARATUS AND METHOD OF COLLATING CATEGORIES OF IMAGES

BACKGROUND OF THE INVENTION

Field of the Invention

The present invention relates to an image processing apparatus that collates categories of photographed image data.

Description of the Related Art

A large number of techniques for collating two image data to determine whether objects expressed by the image data belong to the same category are proposed. A specific example of the object collation techniques includes personal authentication. A category in the personal authentication denotes an individual. In representative techniques of the personal authentication, image data of features specific to individuals, such as faces and fingerprints of persons, is formed and used, and the techniques are called face authentication and fingerprint authentication, respectively. In an example of operation of the personal authentication, one of input image data is compared with each of image data registered in advance to determine the person of the input image data from the persons registered in advance. "Registered" here indicates that the image data is stored along with names and IDs that can specify individuals.

A specific example of the example of operation includes an application for authenticating a specific person as illustrated in Japanese Patent Application Laid-Open No. H11-353485. A second example of operation of the personal authentication includes a technique of collating provided image data groups with each other to divide and classify the image data groups into categories based on persons. Specifically, there is a task called Re-Identification for organizing photographs closed in terms of time and place and for public monitoring images of an unspecified large number of persons illustrated in U.S. Pat. No. 8,213,689 (see Custom Pictorial Structures for Re-identification: D. S. Cheng, M. Cristani, M. Stoppa, L. Bazzani and V. Murino: 2011). There is also Japanese Patent Application Laid-Open No. 2013-196043, wherein specific persons who have conducted fraudulent acts are temporarily registered, and front human face images of the specific persons are searched by face collation from images of all other cameras.

In the examples of operation described above, the number of pairs of image data that need to be collated increases at an accelerated rate with an increase in the registered persons and the provided image data groups. To handle this problem, some techniques for narrowing down the pairs to be collated are proposed. Examples of the technique include Japanese Patent Application Laid-Open No. H11-353485, wherein attributes are obtained from image data of persons, and only persons with close attributes are collated, and Japanese Patent No. 4910827, wherein only pairs of image data with close imaging conditions are collated. Another example includes Japanese Patent Application Laid-Open No. 2010-244511, wherein a feature amount table including feature amounts calculated for all sets of registered data and features is generated, a feature amount of collation data is calculated, and the order of registered data to be collated next is controlled based on the feature amount and the feature amount table.

In the personal authentication, the accuracy of collation is significantly reduced when the image conditions of objects in two image data are different. In an example of the face authentication, a change in the human face direction or the lighting condition of the same person significantly changes the appearance on the image data, and human face images of the same person may be erroneously determined as different persons.

The method disclosed in Japanese Patent No. 4910827 is a method for increasing the speed by not performing the collation with a low collation accuracy in the first place. This is not a method for improving the collation accuracy, but is a method without the collation, which may increase image data that cannot be authenticated. Meanwhile, there is a method for round-robin collation of all image data. If image data can be matched at least once under an imaging condition close to image data of the same person, the image data can be classified into a category. In other words, the image data can be authenticated. However, in the round-robin collation, the number of pairs to be collated explosively increases with respect to the number of image data, and this may not be a realistic method.

SUMMARY OF THE INVENTION

An object of the present invention is to reduce the number of pairs to be collated without lowering collation accuracy when images are collated to classify the images into categories.

According to an aspect of the present invention, an image processing apparatus comprises: a holding unit configured to holding a plurality of images; a condition checking unit configured to check an imaging condition of the plurality of images; a determining unit configured to determine as to whether images among the plurality of images are to be collated or not, based on the imaging condition of each of the plurality of images; a collation unit configured to collate images determined to be collated, to calculate a degree of similarity; and a classifying unit configured to classify the collated images in a same category, when the degree of similarity between the collated images is larger than a predetermined threshold.

Further features of the present invention will become apparent from the following description of exemplary embodiments with reference to the attached drawings.

BRIEF DESCRIPTION OF THE DRAWINGS

FIGS. 1A and 1B are a functional block diagram and a hardware configuration diagram of an object recognition apparatus according to a first embodiment.

FIG. 9 is a diagram illustrating transition of category IDs in the first embodiment and a third embodiment.

DESCRIPTION OF THE EMBODIMENTS

Figure 2A:
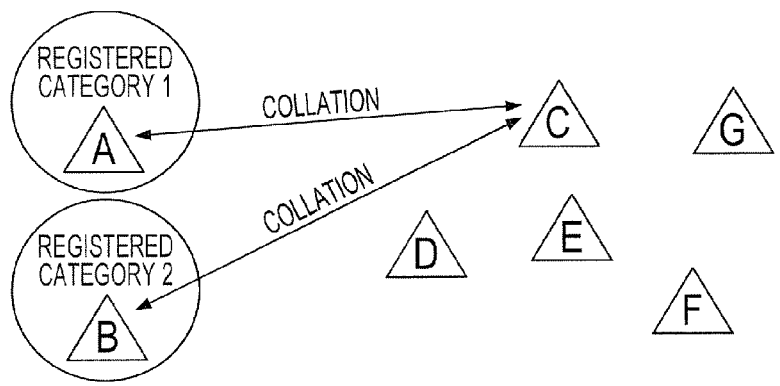
FIGS. 2A, 2B and 2C are diagrams illustrating an example of a process according to the first embodiment.

Preferred embodiments of the present invention will now be described in detail in accordance with the accompanying drawings.

First Embodiment

An embodiment of the present invention will now be described in detail with reference to the drawings. In the present embodiment, identifiers indicating categories of persons are allocated to part of a provided image data group and registered. The categories will be called registered categories, and the image data will be called registered images. The rest of the image data will be called un-processed images. An example of collating the registered categories with the un-processed images to classify all un-processed images into the registered categories will be described. In the present embodiment, an example of face authentication for handling human faces as objects in the image data will be described, and an example of an imaging condition of the human face is a Yaw direction based on the positional relationship between the human face and an imaging apparatus. For the simplification, the image data with a human face will be simply called an image, and the Yaw direction of the human face will be simply called a human face direction.

Although an image may obviously include a plurality of human faces, an image includes only one human face in the description of the present embodiment for the simplification. To process an image with a plurality of human faces, regions with human faces can be cut out from the image before executing the method of the present embodiment, and images with only one human face can be generated. A publicly known method of face detection can be used to cut out the human face regions.

<Entire Configuration>

FIGS. 1A and 1B are diagrams illustrating a configuration of an object recognition apparatus 1000 according to an embodiment of the present invention.

FIG. 1A is a functional block diagram of the object recognition apparatus 1000. As illustrated in FIG. 1A, the object recognition apparatus 1000 includes an image holding unit 1100, a condition checking unit 1210, a collation determining unit 1220, a collation unit 1230, a categorization unit 1240, an image registration unit 1300 and an external output unit 1400.

The image holding unit 1100 can be a device that holds images to be collated (un-processed image group) and that supplies the un-processed images. Typically, the image holding unit 1100 is a storage medium such as a semiconductor memory that allows random access to all unprocessed images, and the image holding unit 1100 can have a large capacity enough to hold a plurality of images. Instead of the storage medium, the image holding unit 1100 can be an imaging apparatus that sequentially supplies the un-processed images, although not described in the present embodiment.

The condition checking unit 1210 checks the imaging condition when an image is taken.

The collation determining unit 1220 performs collation check for checking whether images can be collated based on, for example, whether a difference between imaging conditions (for example, human face directions of subjects) in the images is smaller than a preset threshold. When the imaging condition is not quantitative, the availability of collation can be checked based on whether the imaging conditions are the same.

The collation unit 1230 collates images to obtain a degree of similarity between the images and checks whether objects (for example, faces or whole bodies of persons in the images) are the same or different based on the obtained degree of similarity.

The categorization unit 1240 incorporates a first image and a second image in the same category when the degree of similarity obtained by collating the first image with the second image is equal to or greater than a predetermined threshold.

The condition checking unit 1210, the collation determining unit 1220, the collation unit 1230 and the categorization unit 1240 may be dedicated circuits (ASICs) or processors (such as reconfigurable processors, DSPs and CPUs). Alternatively, the components may exist as programs executed in a single dedicated circuit or general-purpose circuit (CPU for PC).

The image registration unit 1300 holds registered images and holds images provided with identifiers indicating categories of persons. Typically, the image registration unit 1300 can be a repeatedly rewritable semiconductor memory. Usually, the registered images are manually provided, and an example of a method of realizing this includes an external interface for selecting an image in the image holding unit 1100 to add an identifier.

The external output unit 1400 outputs data collected in the image registration unit 1300 to the outside in an appropriate form. The external output unit 1400 can output a collation result of images. The external output unit 1400 typically is a monitor, such as a CRT and a TFT liquid crystal, and the external output unit 1400 lists and displays the images acquired from the image holding unit 1100. Alternatively, the external output unit 1400 displays output of the image registration unit 1300 over an image. These results may be output as electronic data to an external storage medium, or the results may be printed on a paper medium. The output unit is not limited to the ones described above, and a plurality of units may also be used at the same time.

FIG. 1B illustrates an example of a hardware configuration of the object recognition apparatus 1000. The object recognition apparatus 1000 illustrated in FIG. 1B includes a CPU 1510, a ROM 1520, a RAM 1530, an HDD 1540, a video controller 1550, a USB controller 1560 and a network controller 1570.

The CPU 1510 executes a boot program stored in the ROM 1520 and reads an OS or a control program installed in the HDD 1540 to deploy the OS or the control program to the RAM 1530. The CPU 1510 executes the program deployed to the RAM 1530 to control the operation of the entire object recognition apparatus 1000 to realize the functional blocks illustrated in FIG. 1A.

The RAM 1530 is used as a temporary storage area, such as a main memory and a work area, of the CPU 1510. The HDD 1540 stores image data and various programs. The HDD 1540 receives images from other apparatuses through the network controller 1570 and a LAN (not illustrated). The HDD 1540 also receives images from other apparatuses through the USB controller 1560 and a USB flash memory (not illustrated).

The video controller 1550 reads bitmap data for display written in a VRAM (not illustrated) by the CPU 1510 and transfers the bitmap data to a display (not illustrated), such as a CRT, an LCD and a PDP. The user can recognize images before a categorization process and results of the categorization process on the display.

<Entire Processing Flow>

Figure 2B:
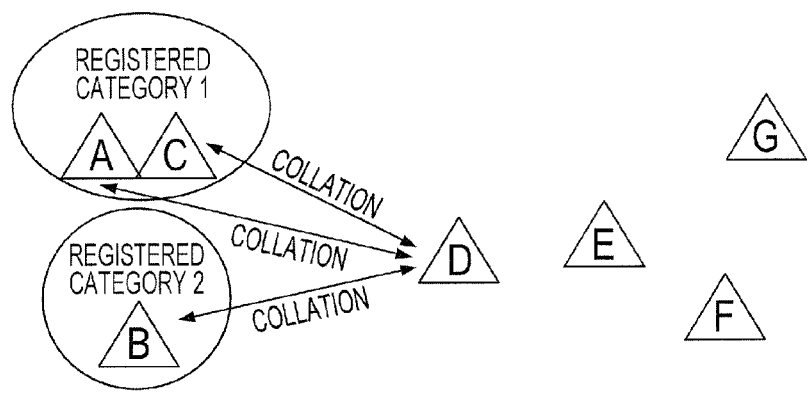

FIGS. 2A and 2B are diagrams of a process in which the object recognition apparatus according to the present embodiment processes an un-processed image group provided to the image holding unit 1100.

FIG. 2A depicts an initial state of registered categories and an un-processed image group. An image A is registered in a category 1, and an image B is registered in a category 2. To process an un-processed image C from this state, the un-processed image C is collated with each of the two images in total, the registered image A of the category 1 and the registered image B of the category 2.

FIG. 2B depicts a state during the process. The person in the image belonging to the category 1 in the drawing and the person in the un-processed image C are identified as the same person, and the un-processed image C is incorporated in the category 1. To process an un-processed image D from this state, the un-processed image D is collated with each of the three images in total, the registered images A and C of the category 1 and the registered image B of the category 2.

Figure 2C:
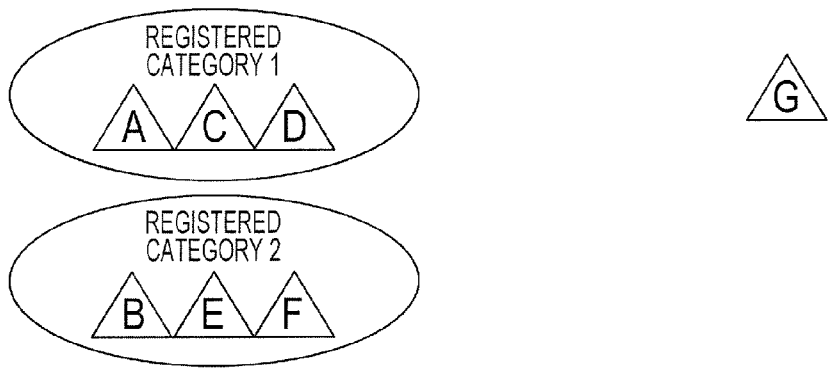

FIG. 2C depicts a final state after the completion of the process. All un-processed images are collated with the registered categories. Images C and D are incorporated in the category 1, and images E and F are incorporated in the category 2. An image G not determined to be the same person as any of the registered images becomes a non-registered person.

Figure 3:
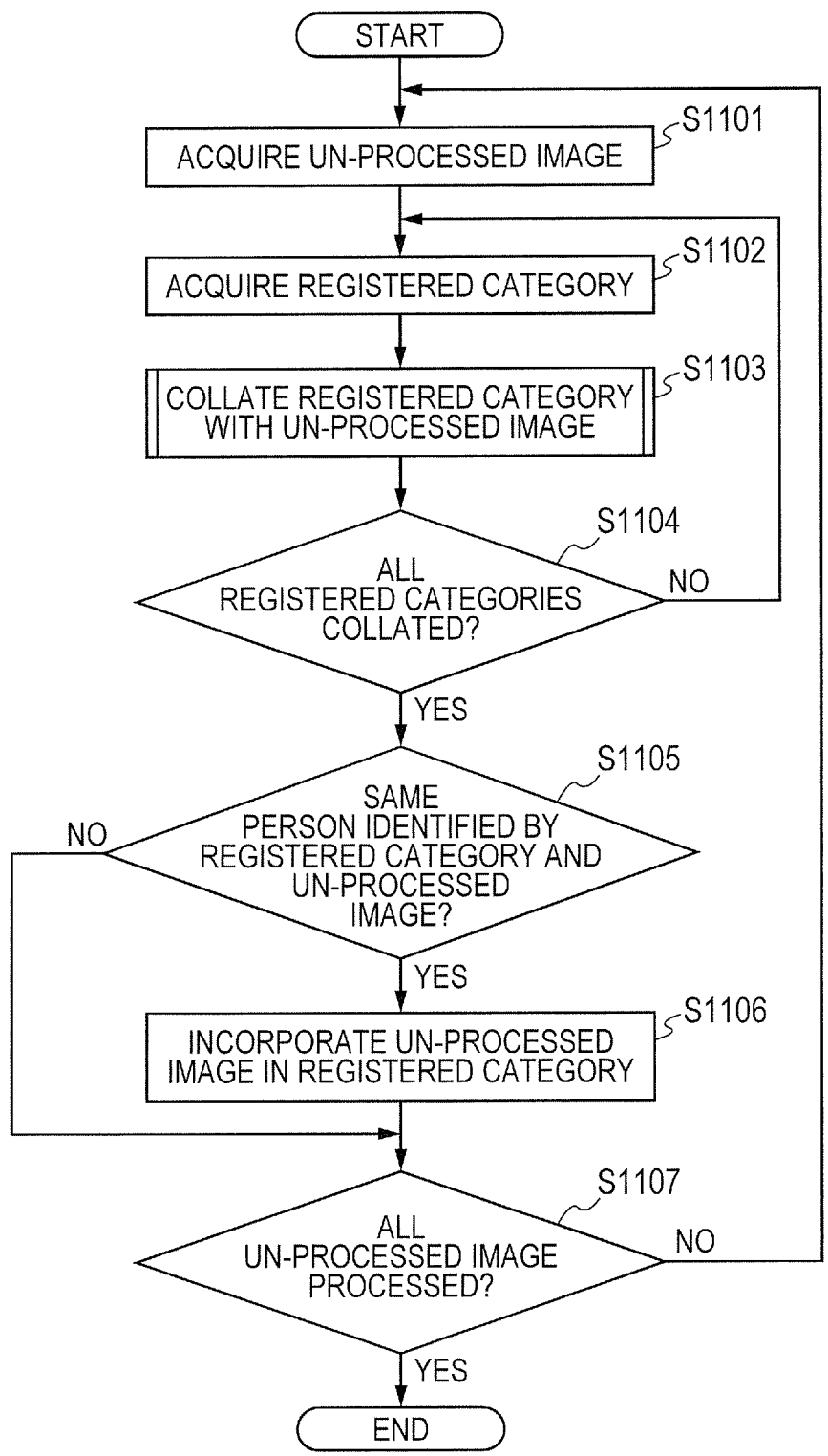
FIG. 3 is a flow chart illustrating an entire process according to the first embodiment.

FIG. 3 is a flow chart of the entire process executed by the condition checking unit 1210, the collation determining unit 1220, the collation unit 1230 and the categorization unit 1240. An actual process of the collation of images by the object recognition apparatus will be described with reference to FIG. 3.

First, one un-processed image is acquired from the image holding unit 1100 (S1101), and one registered category is acquired from the image registration unit 1300 (S1102). Subsequently, the un-processed image is collated with the registered category to obtain a degree of similarity for checking whether persons are the same or different (S1103). Details of this process will be described later.

The un-processed image is collated with all of the registered categories (S1104) to determine whether the same person is identified by the un-processed image and one of the registered categories (whether the un-processed image belongs to one of the registered categories) or the un-processed image does not belong to any of the registered categories (S1105). The process of S1105 will also be described in detail later. If the same person is identified by the un-processed image and a registered category (Yes in S1105), the un-processed image is incorporated in the registered category (S1106). On the other hand, if the same person is not identified (No in S1105), nothing is performed.

The un-processed image after the process from S1102 to S1106 becomes a processed image. The un-processed image may not be able to be collated with all of the registered categories, and the un-processed image is returned to the image holding unit 1100 and waits to be processed, which will be described in the following <Collation Flow>.

Whether all of the un-processed images have been processed is determined (S1107), and the entire process ends if all of the un-processed images have been processed.

<Collation Flow>

The details of the collation of the un-processed image with the registered category in FIG. 3 (S1103) will be described. In the process, the degree of similarity between the person in the un-processed image and the person in an image belonging to the registered category is calculated, and whether the same person is identified is checked based on the calculated degree of similarity.

Figure 4:
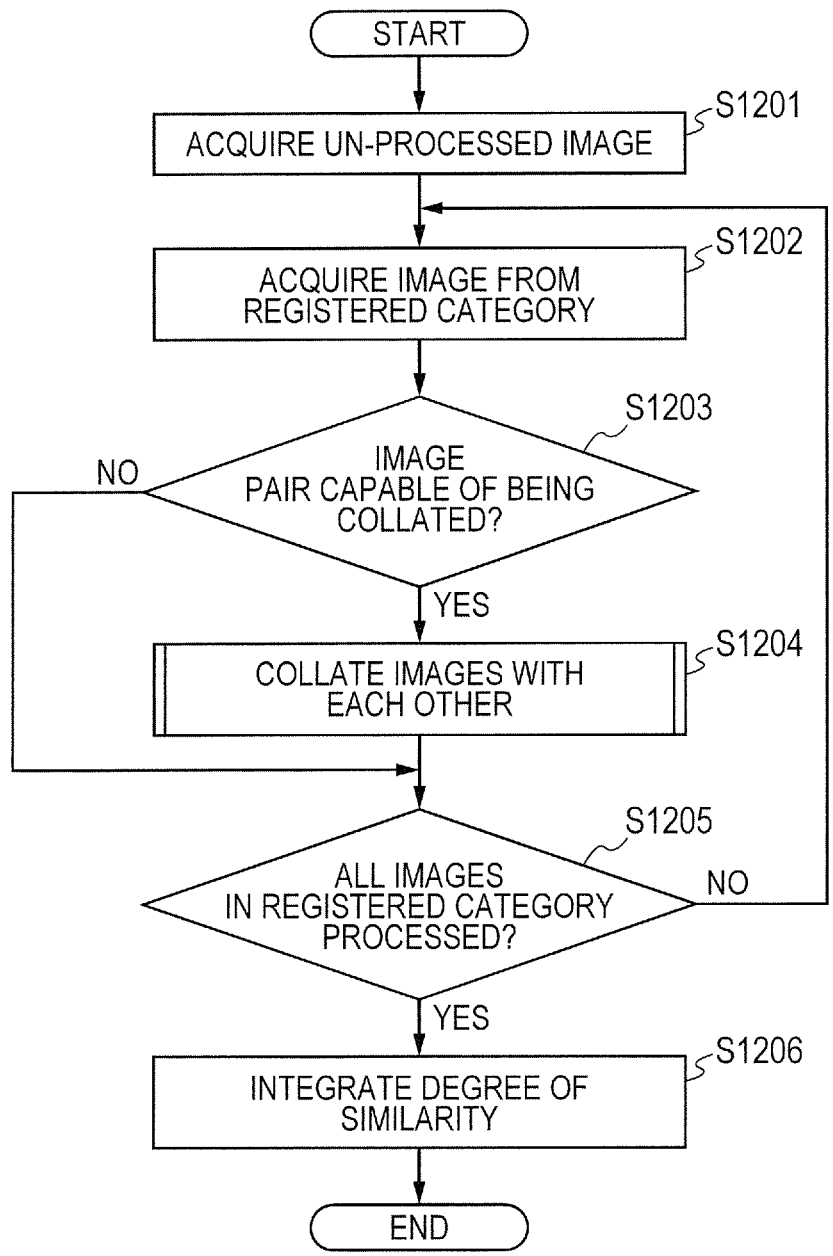
FIG. 4 is a flow chart illustrating details of a collation process of a registered category.

FIG. 4 is a detailed flow chart of S1103 in FIG. 3. An actual process of the collation of the un-processed image executed by the condition checking unit 1210, the collation determining unit 1220, the collation unit 1230 and the categorization unit 1240 will be described with reference to FIG. 4. First, one un-processed image is acquired (S1201), and one registered image is acquired from the registered category to be collated (S1202). Subsequently, whether the un-processed image and the registered image are a pair capable of being collated is checked (S1203).

Specifically, the two images are determined to be capable of being collated if the difference between the human face directions in the images is smaller than a certain level, and the two images are determined to be incapable of being collated if the difference is equal to or greater than the certain level in the present embodiment. The reason is as follows. The appearance on the image significantly changes if the direction of the human face is changed, and the possibility that the same person is determined to be a different person increases. In other words, the accuracy of checking whether the persons are the same or different is reduced. To obtain the human face directions of the un-processed image and the registered image, a publicly known method as described in Support vector machine based multi-view face detection and recognition: Y. Li, S. Gong, J. Sherrah, and H. Liddell: 2004 can be used.

The size of the difference between the human face directions for checking whether the images are capable of being collated or incapable of being collated can be determined before the operation of the apparatus based on characteristics of an actually used human face image collation method (S1204). Subsequently, if the image pair is determined to be capable of being collated (Yes in S1203), the un-processed image is collated with the registered image to obtain the degree of similarity indicating a degree of the same person identified by the un-processed image and the registered image (S1204). An example of details of this method of human face image collation will be described later.

If the image pair is determined to be incapable of being collated (No in S1203), the collation process is not executed. The reason is to speed up the entire process by avoiding the collation with a low accuracy in the first place. The series of processes is applied to all registered images in the registered category (S1205). Lastly, the degree of similarity between the un-processed image and each registered image is taken into account to obtain a final degree of similarity that can check whether the same person is identified by the un-processed image and the registered category (S1206). Details of this process will also be described later.

<Collation Process>

The details of the collation of the un-processed image with the registered image illustrated in FIG. 4 (S1204) will be described. However, the method of human face image collation may be arbitrary in the present embodiment, and the following method is a simple example.

The human face image collation is roughly divided into a step of extracting a feature amount necessary for the collation of an individual and a step of comparing feature amounts to obtain the degree of similarity. In the former step, a rectangular region for extracting the feature amount is first set in the human face image. Although the size of the region is arbitrary, a square with a side about 1.5 times the distance between eyes can be arranged at the center of the human face so that organs, such as eyes and nose, that generally express the features of an individual are all included, but the background is not included.

Subsequently, pixel values in the rectangular region are sequentially extracted from upper left to lower right, and the pixel values are connected to form a vector. The vector serves as the feature amount. The described method is easily affected by a change in the human face direction. A large number of publicly known methods are proposed, such as a feature extraction method that prevents a change in the appearance on the image caused by a change in the human face direction (for example, Towards Pose Robust Face Recognition: D. Yi, Z. Lei, and S. Li: 2012). Such a method can be implemented to reduce as much as possible the degradation of the collation accuracy regarding the human face direction.

A publicly known method can be used to detect the positions of organs, such as eyes and mouth, from the human face image (for example, Active Shape Models—Their Training and Application: T. F. Cootes, C. J. Taylor, D. H. Cooper, and J. Graham: 1998).

In the step of obtaining the degree of similarity, a method in which a large degree of similarity indicates that the feature amounts are similar is selected as a method of comparing the feature amounts to obtain the degree of similarity. Examples of the method includes a method of obtaining the cosine of an angle formed by the vectors of the feature amounts and a method of obtaining the reciprocal of Euclidean distance between the vectors of the feature amounts.

The value of the cosine or the Euclidean distance obtained here serves as the degree of similarity between the un-processed image and the registered image. However, using the degree of similarity at this point is not desirable. This is because the degree of similarity obtained between a front human face and a diagonal human face of the same person may be smaller than the degree of similarity obtained from front human faces of the same person without a change in the image, due to the change in the image. The "front human face" denotes a human face imaged from the front, and the "diagonal human face" denotes a human face image taken at a diagonal angle.

In this case, the degree of similarity between front human faces of different persons may be greater than the degree of similarity between a front human face and a diagonal human face of the same person, and this causes a reduction of the collation accuracy. Therefore, for example, a publicly known method as illustrated in Multi-Subregion Based Probabilistic Approach Toward Pose Invariant Face Recognition: T. Kanade and A. Yamada: 2003 can be used to normalize the degree of similarity to prevent the influence of the difference in the human face direction. Although details will not be described, an occurrence probability distribution of degrees of similarity in each human face direction is obtained in advance in the method, and the degree of similarity obtained in a human face direction is converted into a probability obtained from the same person according to the occurrence probability distribution.

The details of the integration of the degrees of similarity illustrated in FIG. 4 (S1206) will be described. In the steps from S1202 to S1205 of FIG. 4, the number of the degrees of similarity between the un-processed image and the registered images is the same as the number of the registered images when a registered category includes a plurality of registered images. In the process here, at least one or more of the obtained degrees of similarity are integrated to obtain the degree of similarity between the un-processed image and the registered category. Although the method of the process is arbitrary, examples of the method include a method of calculating the average of the obtained degrees of similarities and a method of selecting the largest one from the obtained degrees of similarity.

<Final Checking Process>

The details of the final check for determining whether the un-processed image and the registered category are the same or different illustrated in FIG. 3 (S1105) will be described. In the process here, whether the un-processed image belongs to any of the registered categories is finally checked from at least one or more degrees of similarity between the un-processed image and the registered categories obtained in the steps from S1102 to S1104 of FIG. 3.

Although the method of the process is arbitrary, the following can be typically performed. First, the largest one of the obtained degrees of similarity is selected. Whether the same person is identified is checked based on whether the largest degree of similarity exceeds a preset threshold, and this is the simplest method. If the degree of similarity exceeds the threshold, it is determined that the un-processed image belongs to the registered category corresponding to the degree of similarity. If the degree of similarity does not exceed the threshold, it is determined that the un-processed image does not belong to any registered category.

The threshold can be adjusted in advance before the operation of the apparatus, and the size of the threshold can control the following two tradeoffs. A large threshold reduces the possibility of determining that a pair of images between different persons is a pair of images of the same person, but increases the possibility of determining that a pair of images of the same person is a pair of images between different persons. Conversely, a small threshold reduces the possibility of determining that a pair of images of the same person is a pair of images between different persons, but increases the possibility of determining that a pair of images between different persons is a pair of images of the same person. The threshold can be adjusted according to the performance required in the apparatus.

The main point of the present embodiment is as follows. If the difference between the imaging conditions of the registered image and the un-processed image is large so that it is unlikely that the collation can be performed at a high accuracy, the collation process of the un-processed image is postponed. Another un-processed image is collated and additionally registered, and then the collation of the postponed un-processed image is attempted again. If a registered image with the imaging condition close to that of the postponed un-processed image is additionally registered, it is likely that the un-processed image can be collated with the additionally registered image at a high accuracy. Therefore, the un-processed image is collated again. As a result, there is an advantageous effect that an image that cannot be collated first can be finally collated after the additional registration, while the processed is speeded up by omitting the collation process.

The main point of the present embodiment will be described with a specific example illustrated in FIGS. 5A to 5C. Although FIGS. 5A to 5C depict only one person A (only registered category A) for the simplification, a plurality of registered categories are included in the actual example of operation, and a plurality of un-processed images are also included (un-processed images other than the person A are also included).

Figure 5A:
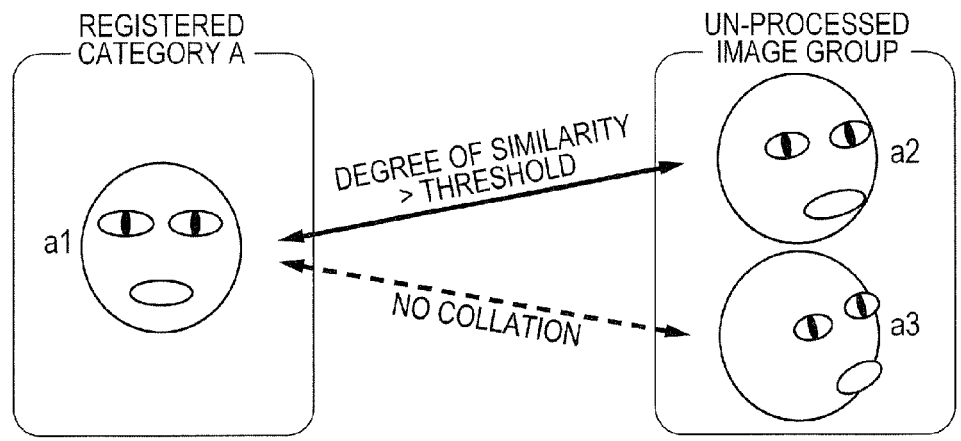
FIGS. 5A, 5B and 5C are diagrams illustrating an example of a process with an advantageous effect according to the first embodiment.

FIG. 5A depicts an initial state of the registered category and un-processed images. A front human face a1 of the person A is registered in the registered category A, and the un-processed images include images a2 and a3 of the person A. The difference between the human face directions of the registered image a1 and the un-processed image a3 is large. It is determined that the collation accuracy cannot be expected, and the collation process is not executed. On the other hand, the difference between the human face directions of the registered image a1 and the un-processed image a2 is small. It is determined that the collation is sufficiently possible, and the collation process is executed.

Figure 5B:
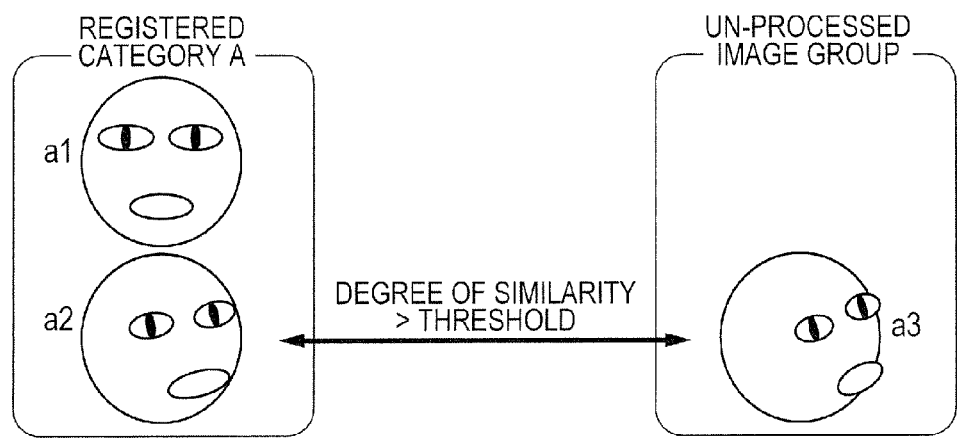

FIG. 5B depicts the result. The degree of similarity between the registered image a1 and the un-processed image a2 is equal to or greater than the threshold. It is determined that the un-processed image a2 is the person A, and the image a2 becomes a registered image of the person A. The difference between the human face directions of the new registered image a2 and the un-processed image a3 is small. It is determined that the collation is sufficiently possible, and the collation process is executed. The degree of similarity between the new registered image a2 and the un-processed image a3 is equal to or greater than the threshold.

Figure 5C:
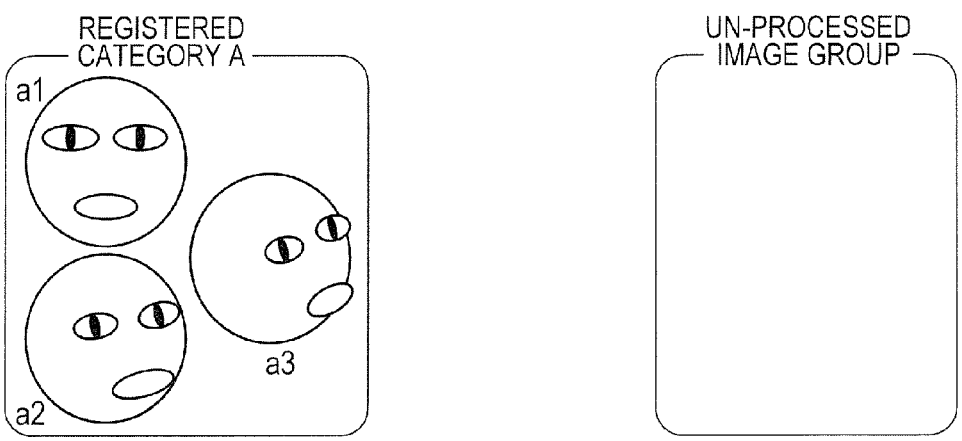

FIG. 5C depicts the result. The degree of similarity between the registered image a2 and the un-processed image a3 is equal to or greater than the threshold, and all images can be finally determined as the person A.

Although the example of the imaging condition is the human face direction of the subject in the description of the present embodiment, the imaging condition is not limited to this. An imaging condition that reduces the accuracy of collation, such as a lighting condition for illuminating the human face, is also included in the imaging conditions described here.

In the example described in the present embodiment, the images are not collated if the human face directions are different, because the collation accuracy is low. Another example will be described, in which imaging conditions other than the human face direction are different, and as a result, whether the persons are the same or different can be accurately recognized without the collation.

In a task of Re-Identification illustrated in Custom Pictorial Structures for Re-identification: D. S. Cheng, M. Cristani, M. Stoppa, L. Bazzani and V. Murino: 2011, public monitoring images taken at a relatively far distance may be processed, and persons can be collated by using not only human faces, but also images of whole bodies. In this case, not only the human face direction and the lighting, but also the body shape, the hair style and the clothes of the person may be able to be used as the conditions for checking whether to perform the collation. For example, if the public monitoring images are taken on the same day, it is unlikely that the body shape, the hair style and the clothes of the same person change. Persons in which one of the body shape, the hair style and the clothes is different can be almost certainly determined as different persons without performing the collation. Therefore, even in the Re-Identification task, there is an advantageous effect of reducing the number of pairs to be collated without lowering the collation accuracy in collating the provided image data group and dividing and classifying the image data group into the categories of persons.

Second Embodiment

In the first embodiment, the order of the collation of un-processed images is not mentioned when the un-processed images are sequentially collated one by one. In the present embodiment, a method of controlling the order of the collation of the un-processed images to reduce erroneous collation will be further described. The same parts as in the previous embodiment will not be described to prevent the repetition of description. Functions of the components not described in the present embodiment are the same as those of the first embodiment.

Entire Processing Flow

Figure 6:
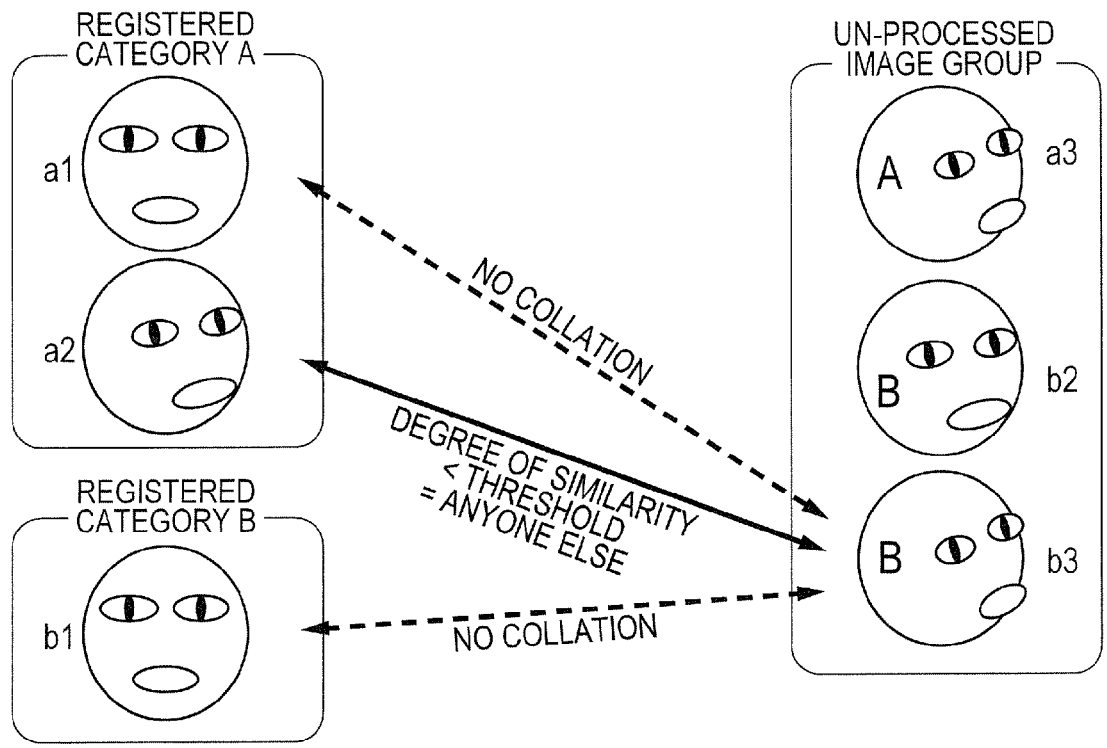
FIG. 6 is a diagram illustrating an example of a process of erroneous authentication according to a second embodiment.

When an image is randomly selected in the process of acquiring one un-processed image (FIG. 3, S1101), the state may be as illustrated in FIG. 6. The state illustrated in FIG. 6 includes registered categories A and B. Registered images a1 and a2 are registered in the registered category A, and a registered image b1 is registered in the registered category B. The un-processed images include a3 belonging to a person A, and b2 and b3 belonging to a person B. The human face directions of the un-processed image b3 and the registered image a1 are significantly different. The difference between the human face directions of the un-processed image b3 and the registered image a2 is small. The human face directions of the un-processed image b3 and the registered image b1 are significantly different. When the un-processed image b3 is to be collated from this state, the same person is not identified by the un-processed image b3 and the registered category B, and the final determination is made from the result of collation with only the registered image a2 of the registered category A that is a different person.

Figure 7:
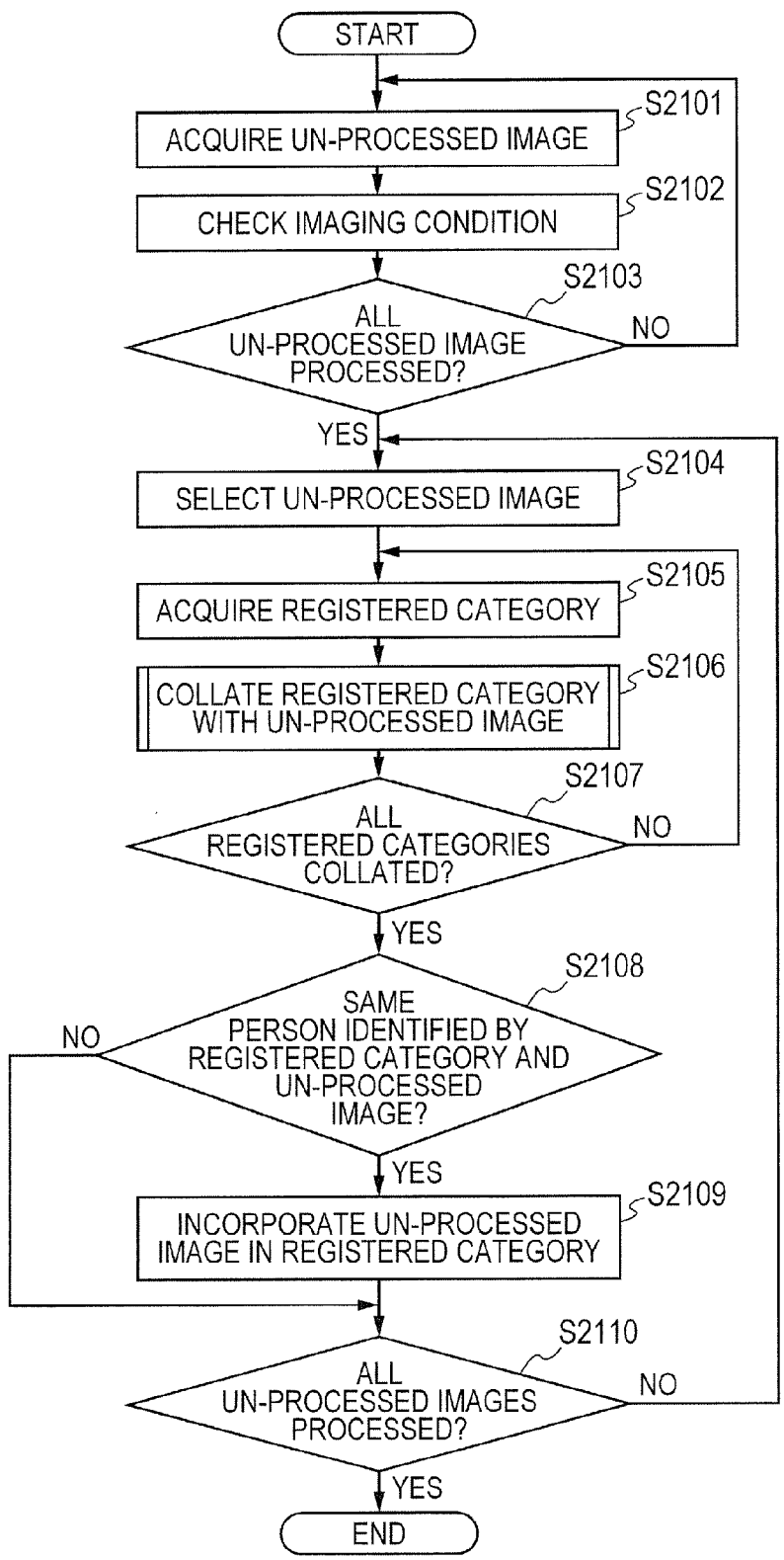
FIG. 7 is a flow chart illustrating an entire process according to the second embodiment.

FIG. 7 illustrates an entire flow chart of the present embodiment. The imaging conditions (human face directions in the second embodiment) of all un-processed images are checked in advance (S2101 to S2103), and an un-processed image to be processed is selected based on the state of the registered images registered in the registered categories (S2104). The process from S2105 is the same as in the first embodiment, and the description will not be repeated.

<Selection of Un-Processed Image>

Details of the process of "selecting an un-processed image" (S2104) illustrated in FIG. 7 will be described. Although not described in the flow chart of FIG. 7, all human face directions of the registered images are checked and already known. In the process of S2104, a queue of un-processed images is generated. In the generated queue, un-processed images determined to be capable of being collated with registered images are set at the top, and un-processed images determined to have at least one registered category that cannot be collated follow the un-processed images at the top.

One of the un-processed images at the top of the queue is then selected. The queue can be created as follows, for example. The differences between the human face directions of the un-processed images and the registered images are obtained, and the un-processed images are arranged in ascending order of total values of the differences. However, the un-processed images with at least one registered category that cannot be collated due to a large difference in the human face direction are arranged at the bottom of the queue. The queue can be generated again when an un-processed image is additionally registered in one of the registered categories in (S2109) of FIG. 7.

A specific example of controlling the order of selecting the un-processed images to prevent erroneous collation will be described with reference to FIGS. 8A and 8B.

Figure 8A:
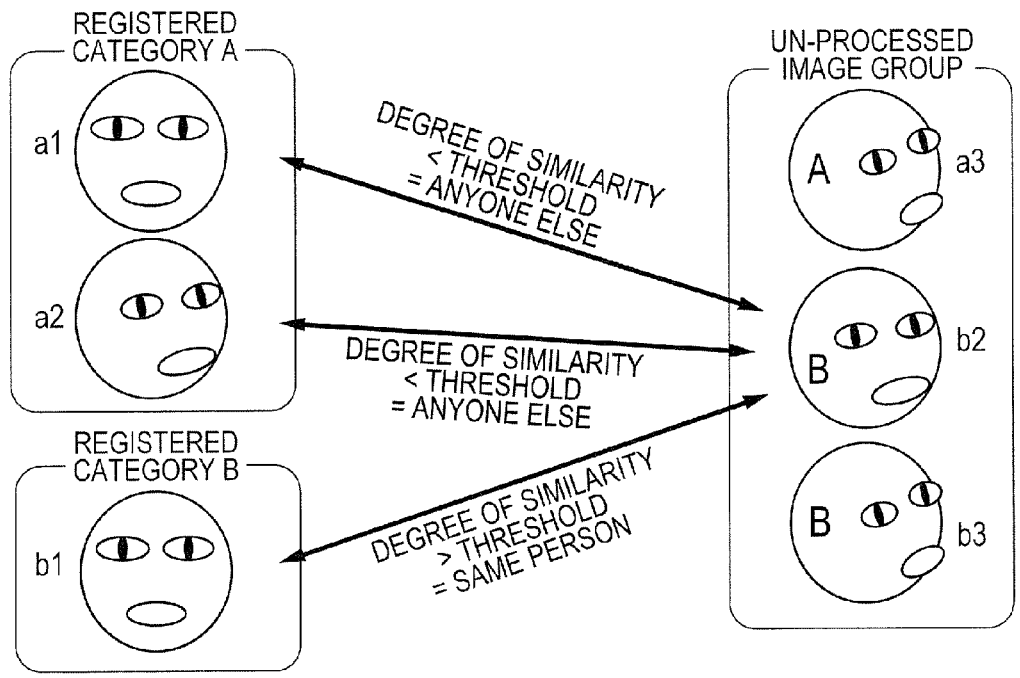
FIGS. 8A and 8B are diagrams illustrating an example of a process with an advantageous effect according to the second embodiment.

The situation of FIG. 8A is the same as in FIG. 6. However, the un-processed image b2 is selected next for the collation process, instead of the un-processed image b3.

This is because the difference between the human face directions of the registered image b1 and the un-processed image b3 is large, and the collation is not possible. The un-processed image b3 is an image with at least one registered category that cannot be collated. As described, an image with at least one registered category that cannot be collated is arranged at the bottom of the queue. The un-processed image a3 is arranged at the bottom of the queue for the same reason. As a result, the un-processed image b2 is arranged at the top of the queue.

Figure 8B:
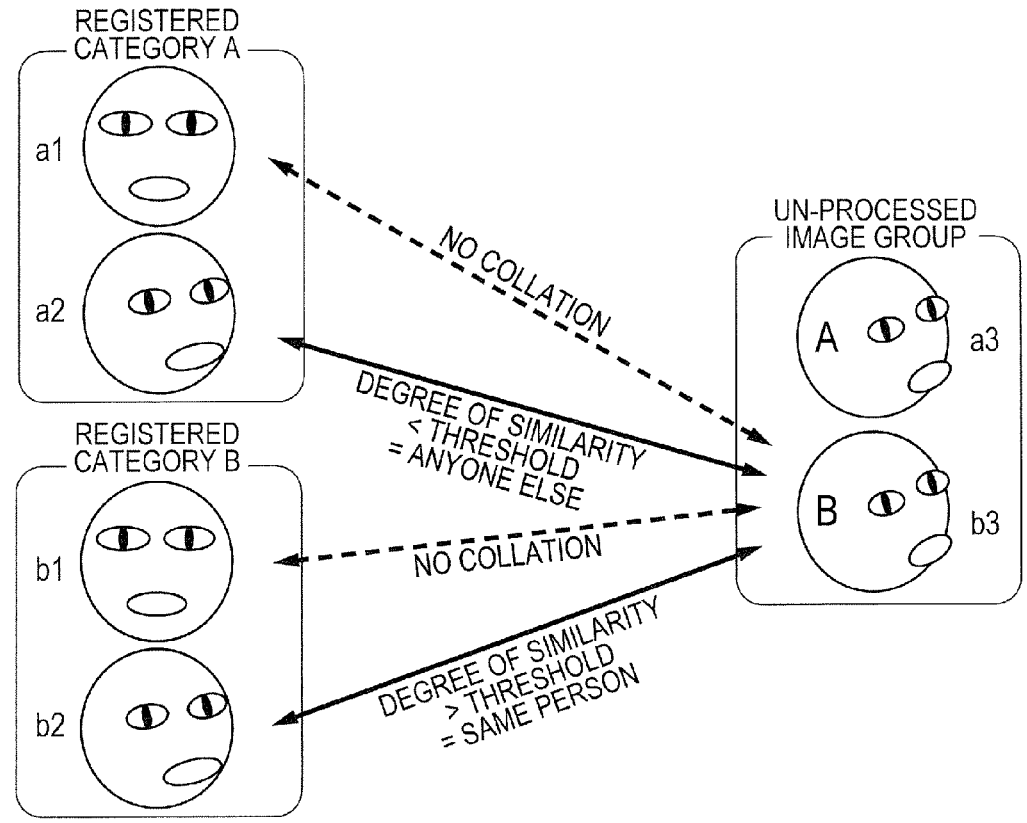

FIG. 8B depicts a result of the execution of the collation process after the selection of the un-processed image b2 from the state of FIG. 8A.

The degree of similarity between the un-processed image b2 and the registered image a1 is smaller than the threshold, and the degree of similarity between the un-processed image b2 and the registered image a2 is also smaller than the threshold. On the other hand, the degree of similarity between the un-processed image b2 and the registered image b1 is greater than the threshold. As a result, the un-processed image b2 is determined to be an image belonging to the registered category B and is additionally registered in the registered category B.

In this state, the difference between the "human face direction of the un-processed image b3" and the "human face direction of the registered image b2 newly registered in the registered category B" is at a level that allows the collation. Therefore, the registered image b2 is collated with the un-processed image b3.

As a result of the collation of the registered image b2 with the un-processed image b3, the degree of similarity between the registered image b2 and the un-processed image b3 is greater than the threshold. Therefore, unlike in FIG. 6, the un-processed image b3 can be recognized as an image belonging to the registered category B.

Third Embodiment

In the example described in the first embodiment, the categories are registered in advance, and all un-processed images are incorporated in the registered categories. In an example described in a third embodiment, the provided image group is not explicitly registered in the categories, and the images are collated with each other within the image group to divide and classify the image group into categories of persons. In the present embodiment, there is no distinction between registered images and un-processed images as for the images of the image group, and all images will be simply called images.

As in the second embodiment, the same parts as in the previous embodiments will not be described to prevent the repetition of description. Functions of the components not described in the present embodiment are the same as those of the first embodiment.

<Entire Configuration>

FIG. 9 is a diagram illustrating transition of category IDs in the first and third embodiments. (1a) to (1c) of FIG. 9 are related to the first embodiment, and (3a) to (3c) of FIG. 9 are related to the third embodiment. Image IDs are identifiers for uniquely identifying the images. Data indicating the imaging conditions, such as human face directions, of the subjects are stored in imaging condition fields of FIG. 9. The image IDs, the imaging conditions and the category IDs illustrated in FIG. 9 are stored in the image registration unit 1300 of FIG. 1A.

As for the relationship between the image ID and the category ID, (1a) of FIG. 9 corresponds to FIG. 2A, (1b) of FIG. 9 corresponds to FIG. 2B, and (1c) of FIG. 9 corresponds to FIG. 2C. Similarly, (3a) of FIG. 9 corresponds to FIG. 10A, (3b) of FIG. 9 corresponds to FIG. 10B, and (3c) of FIG. 9 corresponds to FIG. 10C.

<Entire Processing Flow>

Figure 10A:
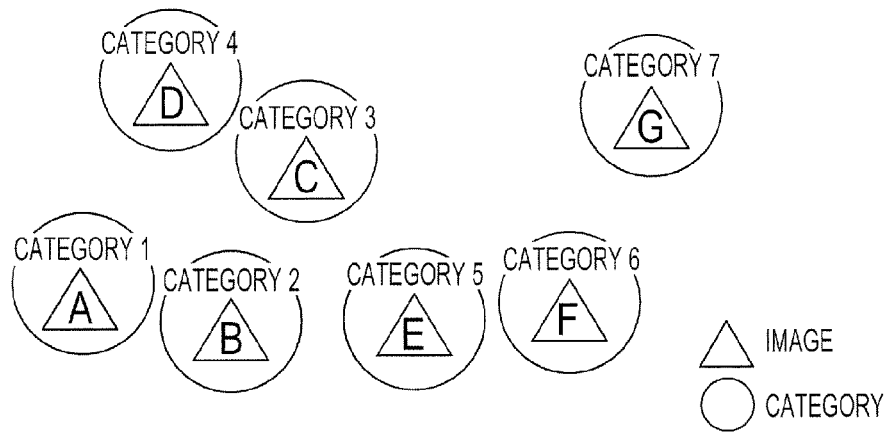
FIGS. 10A, 10B and 10C are diagrams illustrating an example of a process according to the third embodiment.
Figure 10B:
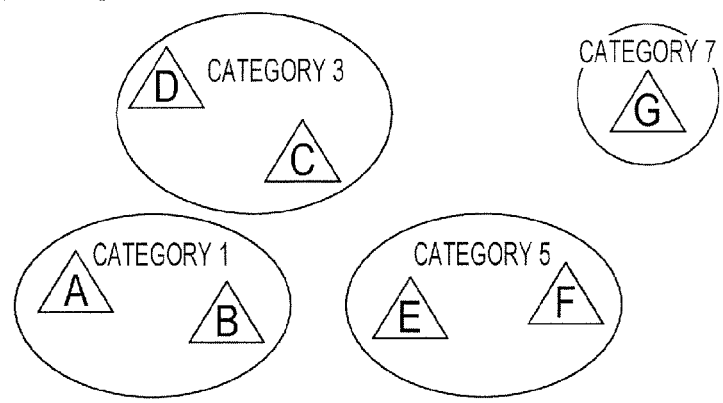
Figure 10C:
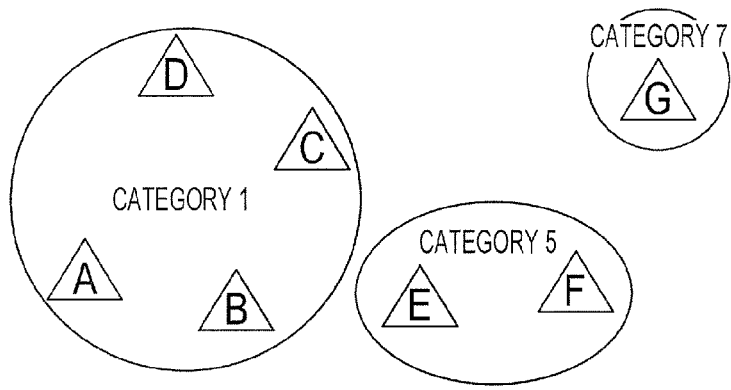

FIGS. 10A to 10C are diagrams of a process in which the object recognition apparatus in the present embodiment processes an image group provided to the image holding unit 1100.

FIG. 10A depicts an initial state of the image holding unit 1100. The number of categories is the same as the number of images, and one image belongs to each category.

FIG. 10B depicts a state during the process. The images are collated, and an image with the same person identified is incorporated in one category, such as in a category 1 in FIG. 10B.

FIG. 10C depicts a final state after the completion of the process. If the same person is identified by one of image pairs in the categories including a plurality of images, such as an image A of the category 1 and an image C of a category 3 in FIG. 10B, the categories are further incorporated. An image, such as an image G, without the same person identified with any of the images is maintained in an independent category.

Figure 11:
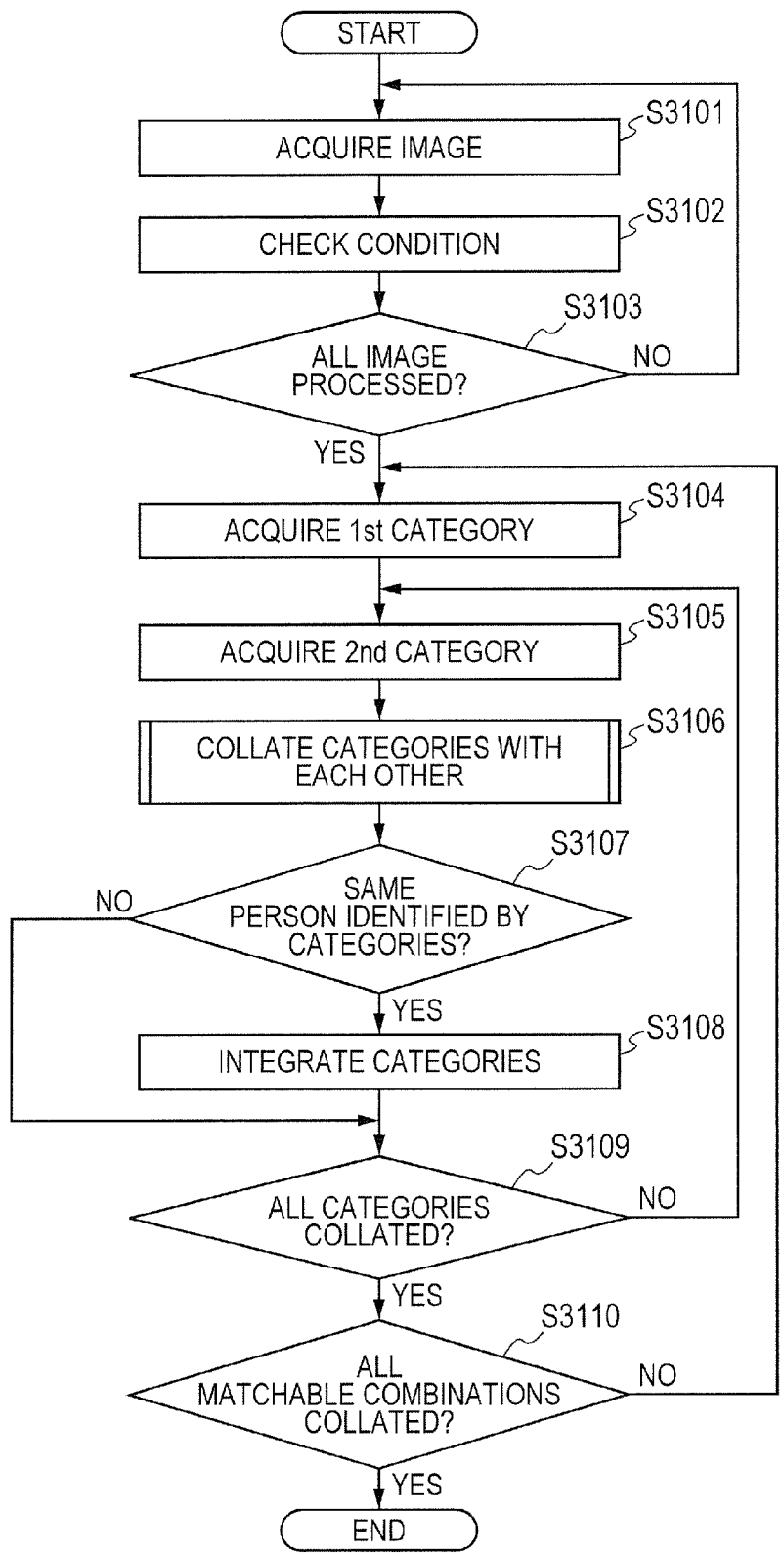
FIG. 11 is a flow chart illustrating an entire process according to the third embodiment.

FIG. 11 is an entire flow chart in the third embodiment. A first difference from the entire flow chart in the first embodiment (FIG. 3) is that the imaging conditions are first checked for all images as in the second embodiment (S3101 to S3103). A second difference is that although one un-processed image is collated with the registered categories in the first embodiment (S1103), the categories may be collated with each other in the present embodiment (S3106), that is, an image group may be collated with an image group. The categories acquired here will be called a first category and a second category for the convenience. Collation between the categories (S3106) will be separately described.

In acquiring categories illustrated in FIGS. 11 (S3104 and S3105), a second category including at least one image capable of being collated with any of the images belonging to the first category is acquired based on the same notion as in the second embodiment. The reason is, as in the second embodiment, to prevent erroneous determination of categories including images of the same person as categories of different persons because the collation cannot be performed due to a large difference between the imaging conditions of an image belonging to one of the categories and an image belonging to the other category.

<Collation Flow>

Figure 12:
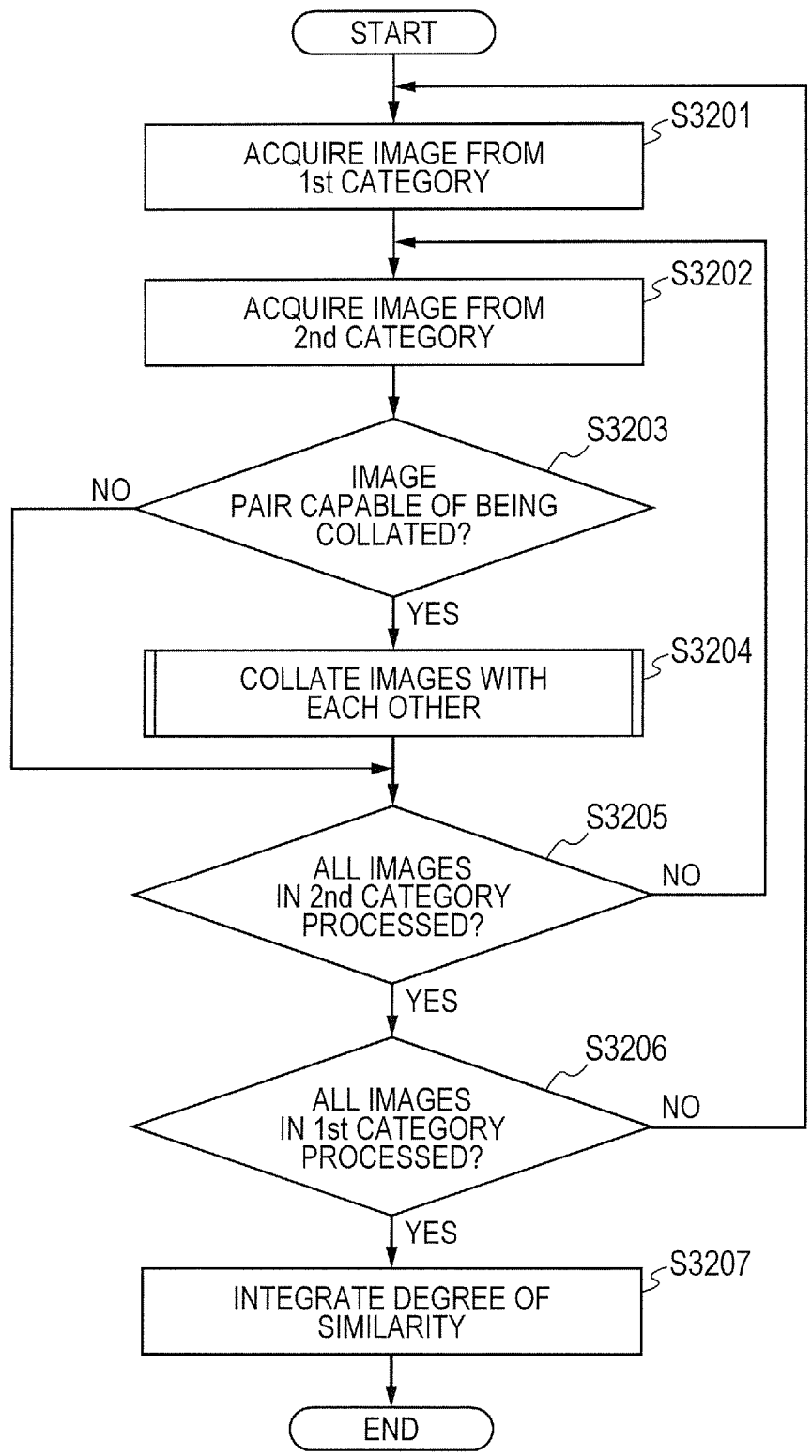
FIG. 12 is a flow chart illustrating details of a collation process of categories.

FIG. 12 is a detailed flow chart of the collation between the categories in FIG. 11 (S3106). An actual process of the collation between the categories will be described with reference to FIG. 12. The difference between FIG. 12 and FIG. 4 of the first embodiment is that the images included in the first category and the images included in the second category are extracted (S3201 and S3202), and the degrees of similarity are obtained by performing round-robin collation (S3205 and S3206). The method of collating the images with each other (S3204) and the method of integrating the obtained degrees of similarity are the same as in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-154334, filed Jul. 29, 2014, which is hereby incorporated by reference herein in its entirety.

What is claimed is:

1. An image processing apparatus comprising:
a memory which stores a program; and
a processor which executes the program stored in the memory to:
    select one of a plurality of unclassified images held in a holding unit in correspondence with respective imaging conditions;
    select one of a plurality of classified images stored in a storage unit in correspondence with respective categories and the respective imaging conditions;
    check a difference between imaging conditions of the selected unclassified image and the selected classified image;
    collate the selected unclassified image with the selected classified image if the difference between the imaging conditions is smaller than a threshold, so that the selected unclassified image becomes a collated unclassified image;
    classify the collated unclassified image in a same category as the selected classified image if the collated unclassified image is determined to be in the same category as the selected classified image from a result of the collation, so that the collated unclassified image becomes a classified collated image; and
    register the classified collated image in the storage unit in correspondence with the same category as the selected classified image and an imaging condition of the classified collated image, so that the classified collated image can be selected as a new classified image to be collated with another one of the plurality of unclassified images,
wherein at least one of the imaging conditions is an orientation of an object or an illuminating condition.

2. The image processing apparatus according to claim 1, wherein with respect to the plurality of unclassified images held by the holding unit, the checking, the collating, and the classifying are repeated, until no further image is classified in a new category.

3. The image processing apparatus according to claim 1, wherein the plurality of unclassified images held by the holding unit are subjected to the checking, the collating, and the registering until no further image is correlated to an identifier of a new category.

4. The image processing apparatus according to claim 1, wherein, when a largest degree of similarity among similarities derived by collating a first image with one or more second images registered in a particular category is smaller than a predetermined threshold, if there is a category including an image determined not to be collated with the first image, the first image is held as an un-processed image by the holding unit.

5. The image processing apparatus according to claim 1, wherein the object is a human face.

6. The image processing apparatus according to claim 1, wherein the object is a human body as a whole.

7. An image processing method comprising:
    selecting one of a plurality of unclassified images held in a holding unit in correspondence with respective imaging conditions;
    selecting one of a plurality of classified images stored in a storage unit in correspondence with respective categories and the respective imaging conditions;
    checking a difference between imaging conditions of the selected unclassified image and the selected classified image;
    collating the selected unclassified image with the selected classified image if the difference between the imaging conditions is smaller than a threshold, so that the selected unclassified image becomes a collated unclassified image;
    classifying the collated unclassified image in a same category as the selected classified image if the collated unclassified image is determined to be in the same category as the selected classified image from a result of the collation, so that the collated unclassified image becomes a classified collated image; and
    registering the classified collated image in the storage unit in correspondence with the same category as the selected classified image and an imaging condition of the classified collated image, so that the classified collated image can be selected as a new classified image to be collated with another one of the plurality of unclassified images,
wherein at least one of the imaging conditions is an orientation of an object, or an illuminating condition.

8. A non-transitory computer-readable recording medium storing a readable program for operating a computer to execute an image processing method comprising:

selecting one of a plurality of unclassified images held in a holding unit in correspondence with respective imaging conditions;

selecting one of a plurality of classified images stored in a storage unit in correspondence with respective categories and the respective imaging conditions;

checking a difference between imaging conditions of the selected unclassified image and the selected classified image;

collating the selected unclassified image with the selected classified image if the difference between the imaging conditions is smaller than a threshold, so that the selected unclassified image becomes a collated unclassified image;

classifying the collated unclassified image in a same category as the selected classified image if the collated unclassified image is determined to be in the same category as the selected classified image from a result of the collation, so that the collated unclassified image becomes a classified collated image; and registering the classified collated image in the storage unit in correspondence with the same category as the selected classified image and an imaging condition of the classified collated image, so that the classified collated image can be selected as a new classified image to be collated with another one of the plurality of unclassified images, wherein at least one of the imaging conditions is an orientation of an object, or an illuminating condition.

* * * * *